May 12, 1959    G. M. HOLLEY, JR., ET AL    2,886,023
FUEL INJECTION SYSTEM
Filed May 9, 1955    4 Sheets-Sheet 1
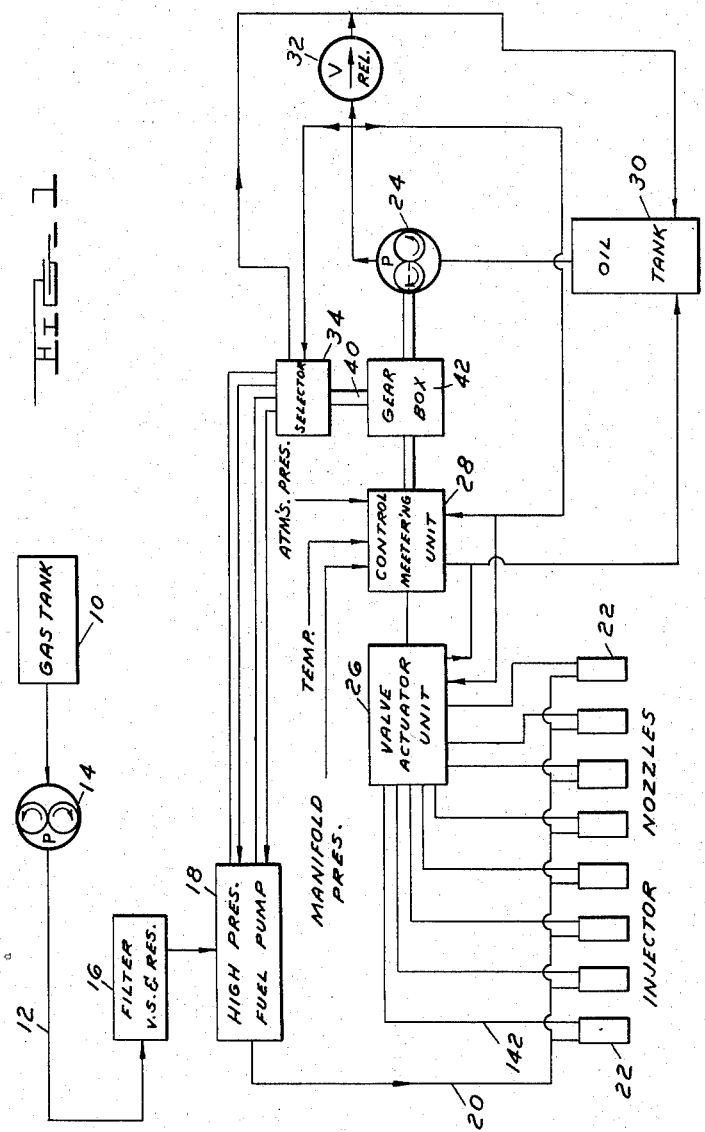
INVENTORS
GEORGE M. HOLLEY JR.
ALTON G. De CLAIRE JR.
BY Whittemore,
Hulbert & Belknap
ATTORNEYS

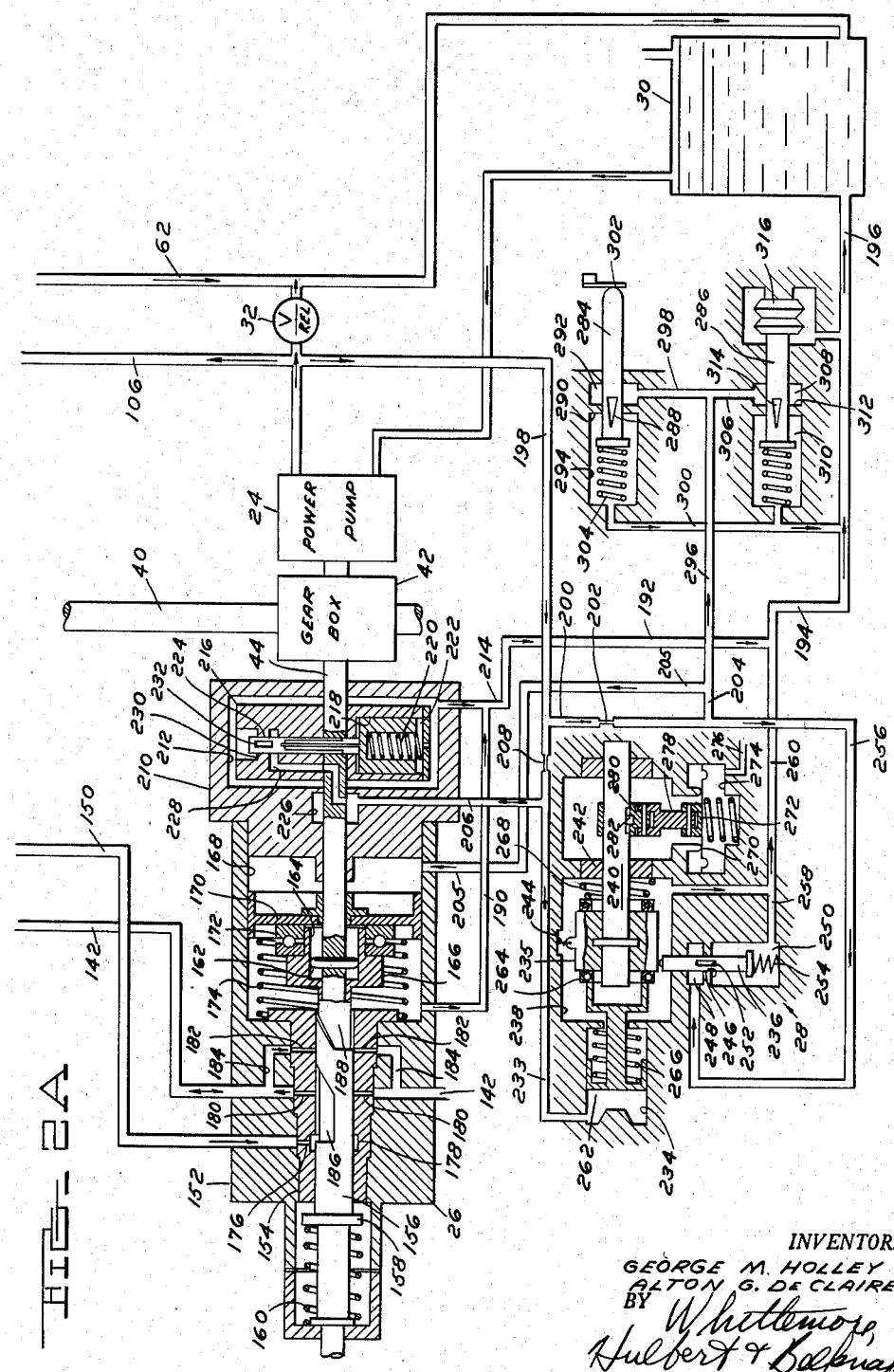

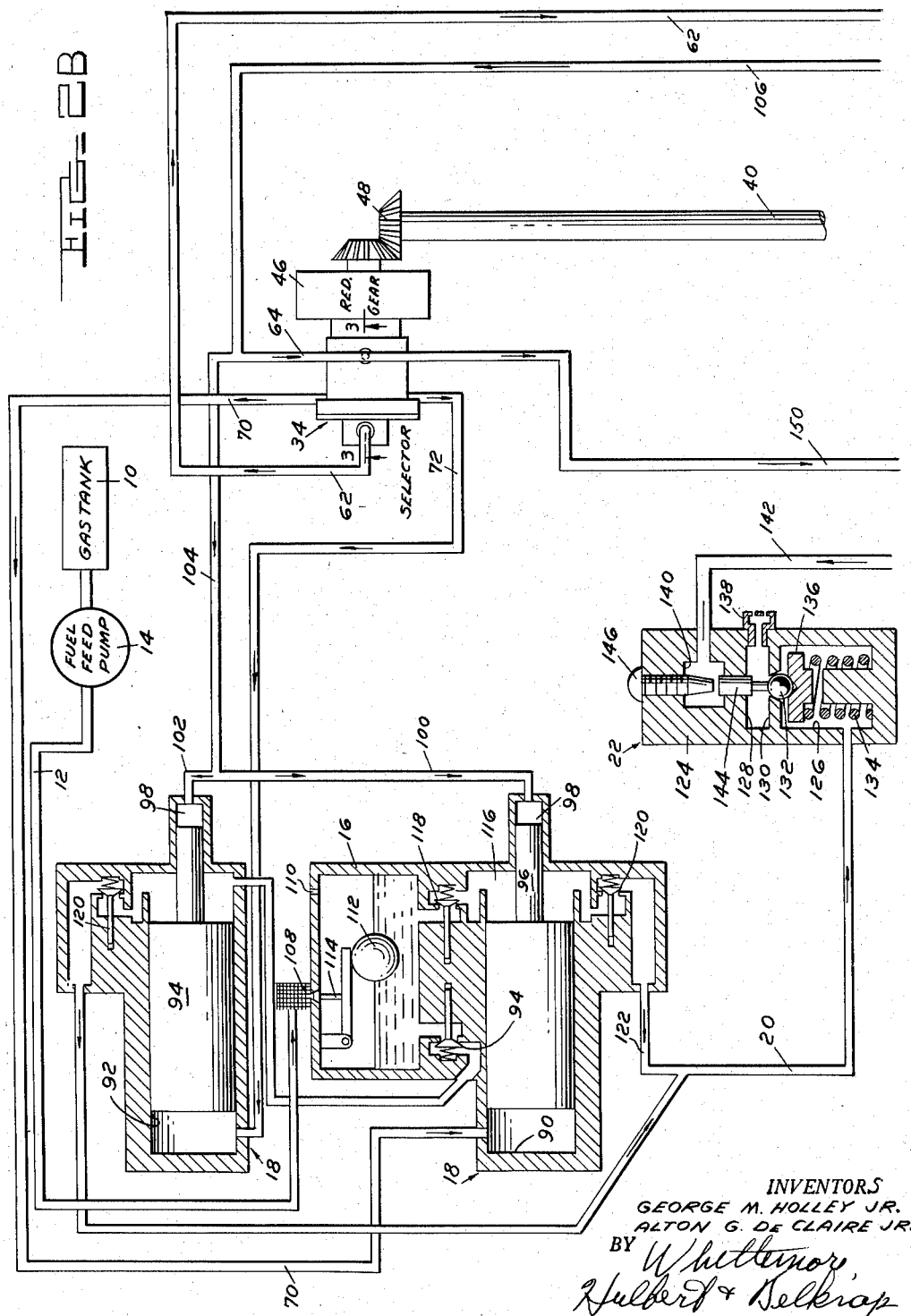

May 12, 1959 G. M. HOLLEY, JR., ET AL 2,886,023
FUEL INJECTION SYSTEM
Filed May 9, 1955 4 Sheets-Sheet 4
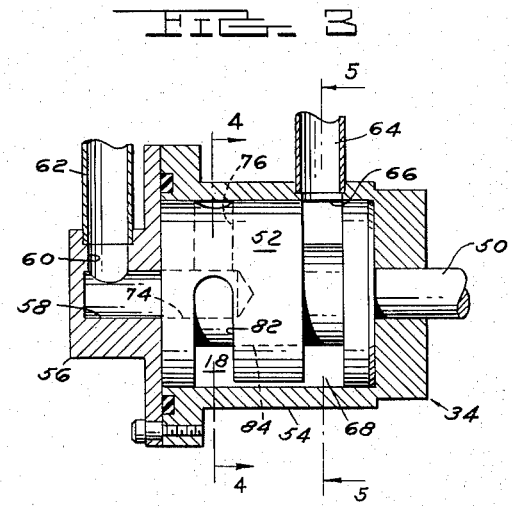
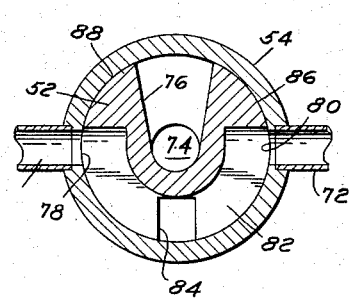
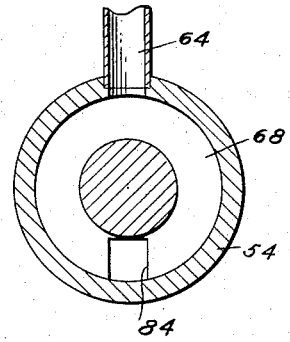
INVENTORS
GEORGE M. HOLLEY JR.
ALTON G. DE CLAIRE JR.
BY *Whittemore,*
*Hulbert & Belknap*
ATTORNEYS

United States Patent Office 2,886,023
Patented May 12, 1959

2,886,023

FUEL INJECTION SYSTEM

George M. Holley, Jr., Grosse Pointe, and Alton G. De Claire, Jr., Harper Woods, Mich., assignors to Holley Carburetor Company, Detroit, Mich., a corporation of Michigan Application May 9, 1955, Serial No. 506,894

31 Claims. (Cl. 123—140)

The present invention relates to a fuel injection system.

It is an object of the present invention to provide a fuel injection system comprising a hydraulically operated fuel pump for delivering fuel to an injection nozzle, a hydraulically actuated fuel valve controlling flow of fuel through the nozzle, a power pump for supplying hydraulic fluid under relatively high pressure, means for supplying hydraulic fluid to said hydraulically operated fuel pump to operate the same, means for supplying hydraulic fluid from said pump to said valve for actuating the same, and means for cyclically controlling the flow of hydraulic fluid to said fuel valve to provide for periodic opening of said fuel valve in a predetermined cycle.

It is a further object of the present invention to provide the fuel supply system as described in the preceding paragraph for an internal combustion engine in which the means for controlling flow of hydraulic fluid to said fuel valve is operated in timed relation to engine speed.

It is a further object of the present invention to provide a fuel injection system for an internal combustion engine comprising an injection nozzle, a valve controlling flow of fluid through said injection nozzle, means for opening and closing said valve in timed relation to engine speed, and condition responsive means for varying the relative valve open and valve closed interval during each complete valve cycle.

It is a further object of the present invention to provide a fuel supply system for an internal combustion comprising a nozzle, a fuel valve for controlling flow of fluid through said nozzle, and means for providing a complete opening and closing movement of said fuel valve once during each cycle.

It is a further object of the present invention to provide a fuel supply system as defined in the preceding paragraph in which the means for effecting opening and closing movement of the fuel valve comprises a control valve including relatively rotatable elements, means for rotating one of said elements in timed relation to engine speed, and condition responsive means for effecting relative axial displacement between said elements.

It is a further object of the present invention to provide a fuel supply system for an internal combustion engine characterized in the accurate metering of fuel to a fuel combustion chamber in which the quantity of fuel and the timing of the supply of fuel is automatically controlled in accordance with variable conditions affecting operation of the engine.

It is a further object of the present invention to provide control means for the fuel supply of an internal combustion engine comprising a hydraulic motor for controlling fuel supply, means for establishing a continuous flow of hydraulic fluid under pressure to said hydraulic motor, and condition responsive bleed means for bleeding a portion of the hydraulic fluid to control the pressure of hydraulic fluid supplied to said motor.

Other objects and features of the invention will become apparent as the description proceeds, especially when taken in conjunction with the accompanying drawings, wherein:

Figure 1 is a diagrammatic view of the fuel supply system.

Figures 2A and 2B together comprise a more detailed diagrammatic view of the fuel supply system with critical parts thereof shown in section.

Figure 3 is a vertical section through a selector valve controlling supply of hydraulic fluid to the high pressure fuel pump.

Figure 4 is a sectional view on the line 4—4, Figure 3.
Figure 5 is a sectional view on the line 5—5, Figure 3.

Referring first to Figure 1, the fuel supply system comprises the gas tank 10 from which fuel is drawn through line 12 by a fuel feed pump 14 through a filter, vapor separator and reservoir unit 16, from whence it is drawn by a high pressure fuel pump 18 and discharged through line 20 to a plurality of fuel injector nozzle units diagrammatically indicated at 22.

Actual admission of fuel through the injector nozzles is controlled by hydraulically actuated valve means and for this purpose a high pressure hydraulic power pump 24 is provided which supplies high pressure hydraulic fluid in a repeating on and off cycle to each of the injector nozzles. The flow of high pressure hydraulic fluid to the injector nozzles to open the fuel valves therein, and the reverse flow of hydraulic fluid to permit closure of the fuel valves is controlled by a valve actuator unit 26, the operation of which is influenced by a control-metering unit 28 which in turn is responsive to variable conditions as will subsequently be described in detail. The hydraulic fluid is drawn from an oil tank 30 by the power pump 24 and the pressure of the output of the power pump 24 is controlled by a relief valve 32. The high pressure fuel pump is operated by hydraulic fluid supplied from the power pump 24 and the fluid passes through a rotary selector valve 34 which supplies and exhausts the actuating hydraulic fluid alternately to and from a plurality of pumping pistons.

Referring now to Figures 2A and 2B there is shown a rotary shaft 40 which may be driven from the cam shaft or other rotating part of an internal combustion engine. A gear box 42 is provided containing gearing by means of which a shaft 44 is driven at the same speed as the shaft 40 or cam shaft speed, which is one-half engine speed. The shaft 44 drives the power pump 24 and the rotating valve member of the valve actuated unit 26. The shaft 40 connects to a reduction gear 46 through beveled gearing indicated generally at 48. The reduction gearing may be of the differential planetary type adapted to have an output shaft driven at a speed reduction of high values as for example 200 to 1.

The fuel pump indicated generally at 18 is designed to be operated by high pressure hydraulic fluid from the power pump 24 as controlled by the selector 34. The selector 34 is shown in detail in Figures 4, 5 and 6. The output shaft of the reduction gear is indicated at 50 and is connected to a rotating valve part 52 disposed within a cylindrical housing 54 having a removable cap 56 at one end including an axially extending passage 58 connected to radially extending passage 60, which in turn is connected to conduit 62 which is an exhaust conduit leading to the oil reservoir 30. Fluid is supplied to the selector 34 through a conduit 64 communicating with a port 66 located at one side of the housing 54. The rotary valve element 52 as best seen in Figure 5, includes a complete annular channel 68 which during operation of the selector is at all times filled with hydraulic fluid under the high pressure as supplied by the power pump 24 and controlled by the relief valve 32. The hydraulic fluid is discharged from the selector 34 through a pair of discharge passages 70 and 72 in a timed sequence which will become apparent as the description proceeds.

Referring now to Figures 3 and 4 it will be observed that the rotating valve element 52 includes a central passage 74 which at all times is in communication with the passage 58 leading to the discharge conduit 62. The central passage 74 communicates with a radially extending passage 76 which is adapted during rotation of the rotary valve element 52 to make a connection alternately with ports 78 and 80 communicating respectively with conduits 70 and 72. At the same time, the rotary valve element 52 is provided with an arcuate chamber 82 of somewhat more than 180 degrees angular extent. The chamber 82 is in the plane of registration of the ports 78 and 80. The chamber 82 communicates with the complete annular chamber 68 by an axially extending passage 84 so that high pressure fluid is supplied from annular chamber 68 through passage 84 to arcuate chamber 82 at all times.

With the parts in the position illustrated in Figure 4 it will be appreciated that high pressure hydraulic fluid supplied through inlet conduit 64, port 66, annular chamber 68, axially extending passage 84, and arcuate passage 82 may pass out through both of the conduits 70 and 72. If it is assumed that the rotating valve element 52 is rotating clockwise it will be further apparent that upon limited additional rotation of the valve element, the port 80 will be closed by a land surface 86. At this time the port 78 is still in communication with the arcuate chamber 82 and fluid under pressure is supplied through conduit 70. A limited additional rotation of the valve element 52 bring the valve chamber 76 in communication with the port 80 so that fluid in the conduit 72 may return through the chambers 76 and 74 to the exhaust conduit 62. Limited additional rotation will bring the land surface 88 of the rotary valve 52 in closing relation to the port 80. Thereafter, the land 88 will move across the port 80 and again open the conduit 72 to a supply of pressure fluid. During all of this time the conduit 70 has remained in communication with the supply of pressure fluid. At this time the rotary valve element 52 will have completed 180 degrees of rotation. The following 180 degrees of rotation will result in first closure of the port 78 by the land 86, followed by communication of the port 78 with the discharge chamber 76, and that in turn followed by temporary closure of the port 78 by land 88, thus completing a cycle. In general terms, it will be observed that hydraulic fluid under pressure is alternately supplied and exhausted to conduits 70 and 72. Further, the period of supply overlaps substantially and is relatively long as compared to the period during which the conduits are connected to exhaust.

The supply conduits 70 and 72 communicate respectively with the interior of cylinders 90 and 92. The high pressure fuel pump 18 includes the two cylinders 90 and 92 referred to, which in general are identical and hence only one of these will be described in complete detail. In the cylinder 90 there is provided a piston 94 having a reduced end portion 96 slidable in a small cylinder 98. The cylinder 98 is continuously supplied with high pressure hydraulic fluid through the conduit 100 which with a branch conduit 102 connects through conduit 104 to the main outlet conduit 106 of the power pump. The combination reservoir, filter and vapor separator indicated generally at 16 includes the filter element 108, a port 110 communicating with atmosphere to permit escape of vapor, and a float 112 controlling admission of fuel from the fuel feed pump 14 by operation of an inlet valve 114.

If it is assumed that the selector 34 has its rotary valve 52 in the position illustrated in Figures 3–5, it will be appreciated that high pressure hydraulic fluid is being admitted from the conduit 70 to the cylinder 90 and exerts a pressure against the left hand end of the enlarged piston 94. At the same time, high pressure hydraulic fluid is being admitted through the conduit 100 to the small cylinder 98 where it acts against the relatively small exposed end of the reduced extension 96 of the cylinder. Under these circumstances, substantial forces are developed tending to move the piston 94 to the right. At this time the space or chamber designated at 116 to the right of the piston 94 is filled with fuel and movement of the piston to the right has the effect of closing or permitting closure of check valve 118 while opening check valve 120. Accordingly, fuel under high pressure is forced past the check valve 120 through branch conduit 122 to conduit 20 to the fuel injector nozzle unit indicated generally at 22. It will be recalled that the operation of the selector was such as to provide substantial time overlap in the supply of hydraulic fluid under pressure to conduits 70 and 72. Accordingly, at any time pressure is cut off from either of the cylinders 90 or 92, it is being supplied to the other of these two cylinders so that fuel under high pressure is always present in conduit 20 from the operation of one or the other of the pistons of the high pressure fuel pump.

It will also be observed that when high pressure hydraulic fluid is disconnected from the cylinders 90 or 92, return flow of fuel will be effectively prevented by the check valves 120. When the rotating valve element 52 reaches a position in which the exhaust chamber 76 communicates with either of the ports 78 or 80, the hydraulic fluid in the corresponding cylinder 90 or 92 is returned to the tank through the action of the always present hydraulic fluid pressure existing in small cylinder 98. In operation, either or both of the large pistons 94 in the cylinders 90 or 92 is urged in pumping direction by high pressure hydraulic fluid and periodically each of the pistons is retracted on a suction stroke while pressure is maintained at the injection nozzle by the operation of the other piston. It will of course be apparent that the suction stroke of the pistons 94 is to the left as seen in Figure 2B, and such stroke immediately permits closure of check valve 120 while causing check valve 118 to open as a result of differential pressure to draw fuel from the reservoir 16 into the pumping chamber.

Fuel through conduit 20 is conducted to each of the fuel injector units 22. These units, as illustrated in Figure 2B, each comprises a block 124 having an inlet chamber 126, an outlet chamber 128 separated by a partition 130 having an opening surrounded by a valve seat therein. Associated with the valve seat is a valve element 132 illustrated as in the form of a ball. Located in the inlet chamber is a compression spring 134 engaging a valve actuator 136, which in turn engages the ball valve 132. The arrangement is such that the compression spring 134 and the pressure of the fuel tends to maintain the valve 132 in closed position.

The outlet chamber 128 communicates with an injection nozzle 138 through which fuel is discharged.

In order to effect the required opening and closing movement of the valve 132 to regulate the supply of fuel to the internal combustion engine in properly timed relation and in properly controlled amount, there is provided in the injector unit a control chamber 140 in communication with a conduit 142. Between the control chamber 140 and the outlet chamber 128 is a cylindrical passage in which is slidably mounted a piston 144 having a reduced extension in contact with the ball valve 132. Extending into the control chamber 140 is a screw 146 the inner end of which constitutes an abutment engageable by the end of the piston 144 to limit its movement under the impulse of fuel pressure when pressure is cut off or reduced in conduit 142.

In order to control the quantity and timing of fuel supply to the internal combustion engine, the mechanism illustrated in detail in Figure 2A is provided. High pressure hydraulic fluid is supplied to the valve actuator unit 26 through a conduit 150 and it is admitted to the conduit 142 leading to the control chamber of the injector unit at timed intervals by mechanism which will now be described.

The valve actuator unit comprises a housing 152 in which there is located a valve sleeve 154 in which in turn is rotatably mounted a control valve 156. The valve 156 is provided adjacent one end with a radial flange 158 against which bears a compression spring 160, the effectiveness of which may be varied or adjusted to control fuel injection.

The control valve 156 is tubular and is longitudinally or axially slidable on the shaft 44. Rotation is imparted to the control valve 156 through a key 162 extending through an opening in the shaft 44 and into an elongated slot 164 provided in an enlarged head 166 adjacent one end of the control valve 156. The housing 152 includes an enlarged cylindrical chamber 168 in which is slidably received a piston 170 adapted to apply forces to the valve 156 tending to move the valve to the left as seen in Figure 2A. Since the valve and shaft 44 are rotated at the same speed as the cam shaft, a thrust bearing 172 is preferably provided between the piston 170 and the head 166 of the valve 156.

Received within the chamber 168 and engaging one end of the chamber is a compression spring 174 adapted to urge the piston 170 to the right as seen in the figure. Thus, it will be seen that it is necessary to overcome both the spring 160 and the spring 174 to effect movement of the control valve 156 to the left as a result of forces applied to the right of the piston 170.

The valve sleeve 154 has a radial passage 176 communicating with a complete annular recess 178. The passage 176 is in communication with the conduit 150 through which high pressure hydraulic fluid is introduced to the valve actuator 26. Also, extending radially through the valve sleeve 154 are a plurality of pairs of supply passages 180 and return passages 182. Supply passages 180 communicate with the supply conduits 142 leading to the injector units. It will be appreciated that one conduit and one associated supply passage and return passage 180 and 182 are provided for each nozzle or set of nozzles which is to supply fuel at a time different from another nozzle or set of nozzles. Thus, in a proper case, each conduit 142 may supply two or more injector units if the fuel is to be supplied through the nozzles of these injector units at the same time.

A cross connecting passage 184 is provided in the housing 152 so as to permit fluid under pressure in line 142 to flow into the housing when the passage 180 is closed and to flow through the return passage 182 and thence to the reservoir 30 for hydraulic fluid.

The rotating valve 156 is provided with cooperatively shaped recesses 186 and 188. With the parts in the position illustrated in Figure 2A, it will be observed that hydraulic fluid under pressure is admitted through the conduit 150, the passage 176, to the annular recess 178, and thence to the recess 186 formed in the outer surface of the rotatable valve 156. Thus, hydraulic fluid under pressure is present at all times in the chamber formed by the recess 186. Hydraulic fluid may flow from the chamber formed by the recess 186 through the upper supply passage 180, and through the upper supply conduits 142 to one of the fuel injector units. At the same time, the supply of hydraulic fluid under pressure is cut off from the lower passage 180 and conduit 142. High pressure hydraulic fluid flowing through the upper passage 180 is prevented from returning through the cross passage 184 and return passage 182 by reason of the fact that the port at the inner end of the upper passage 180 is closed by a land surface on the valve 156 intermediate the recessed portions 186 and 188 thereof. On the other hand, fluid in the conduit 142 is permitted to flow through the lower cross passage 184 to the lower return passage 182 and this in turn communicates with a chamber formed by the recess 188. Thus, fluid under pressure in the passage 142 may return to the hydraulic fluid reservoir 30 by flowing into the cylinder 168 to the left of the piston 170 and thence through return conduits 190, 192, 194 and 196.

It will be observed that the recesses 186 and 188 are correspondingly shaped so that as the valve is shifted to the left by forces acting on the piston 170, the proportionate interval during each revolution of the valve 156 in which the hydraulic fluid is supplied to the supply passage 180 is diminished, while the proportionate interval during which the return passage 182 is in communication with the return chamber formed by the recess 188, is correspondingly increased. It will of course be recalled that pressure developed in the conduit 142 is effective to lift the fuel supply valve from its seat. Accordingly, the quantity of fuel supplied through each individual fuel injection nozzle during each revolution of the valve 156 is determined by the longitudinal position of the valve.

It will of course further be apparent that the timed relation between fuel injection from different nozzles will be dependent upon the location of the several sets of passages 180 and 182 about the circumference of the valve sleeve 154.

In order to control the position of the valve 156 in accordance with variable conditions, additional mechanism is provided. Described in general terms, this mechanism includes means for supplying hydraulic fluid under pressure to the cylinder 168 to the right of the piston 170. The passage means interconnecting the source of hydraulic fluid under pressure to the cylinder includes a restriction or restrictions and bleed means are provided intermediate the restriction and the cylinder so as to provide a sensitive control of pressure in the cylinder 168.

Referring to the drawings it will be observed that the power pump 24 is in direct communication with conduit 198 and that fluid passing through the conduit 198 passes through a branch conduit 200 having a restriction 202 therein. Fluid passing the restriction 202 passes through branch conduits 204 and 205 to the interior of the cylinder 168.

In order to control the pressure of fluid in the cylinder 168, means are provided for bleeding off hydraulic fluid at rates dependent upon variable conditions. One of the bleed means is the control-metering unit indicated at 28, which includes means subsequently to be described responsive to engine speed. For this purpose a conduit 206 is provided which communicates with the conduit 198 and which includes a restriction 208. Within a body 210 forming an end closure for the cylinder 168 there is provided a chamber 212 which is vented by conduit 214 communicating with return conduit 190 to permit hydraulic fluid within the chamber 212 to return to the hydraulic fluid tank 30. Keyed or otherwise secured to the shaft 44 within the chamber 212 is a support body 216 including a recess 218 in which a centrifugal weight 220 is radially movable. The weight 220 is urged radially inwardly toward the axis of the shaft 44 by a compression spring 222. Diametrically opposite to the centrifugal weight 220 and rigidly connected thereto is a movable valve element 224. The conduit 206 communicates with an annular chamber 226 in the body 210 and this in turn communicates with a passage 228. The valve 224 includes a portion slidable in a cylindrical opening in a transverse wall 230 and is provided with a profiled passage or valve port 232. Accordingly, flow of fluid through conduit 206, passage 228, port 232, and thence to the hydraulic fluid tank through the drain conduits 214, 192, 194 and 196, is dependent upon the position of the centrifugal weight 220, which in turn is dependent upon the speed of rotation of the shaft 44.

Connected to the conduit 206 is a conduit 233 which communicates with the interior of a cylinder 234. The control-metering unit 28 includes a cam 235 which is contoured both circumferentially and axially so as to provide a positioning action on a cam follower 236 which is dependent simultaneously upon axial and rotational displacement of the cam 235. The cam 235 is located in a chamber 238 and is supported therein on a shaft 240 mounted for rotation and axial movement in bearings 242. Cam 235 is connected to a wall of the chamber 238 by resilient means indicated diagrammatically at 244 tending to retain the cam 235 in a predetermined position but yieldable in response to forces applied to the cam which in turn are dependent upon variable conditions. The cam follower 236 includes an intermediate portion movable in a cylindrical opening in a partition 246 intermediate an inlet chamber 248 and an outlet chamber 250. The cam follower includes a profiled valve port 252 affording communication between chambers 248 and 250 dependent upon the position of the cam follower. Resilient means 254 is provided which maintains the cam follower 236 in contact with the outer surface of the cam 235. Fluid is supplied to the inlet chamber 248 through a conduit 256 which connects with conduit 204. The outlet chamber 250 communicates by return conduits 258, 260 with conduit 194 and thence through return conduit 196 to the hydraulic fluid tank 30. Accordingly, when cam follower 236 is moved to a position to increase flow through the valve port 252, this results in a drop in pressure in the hydraulic fluid supplied through the passage 205 to the interior of the cylinder 168.

As previously described, the pressure existing within the cylinder 234 at the left hand end of the control-metering unit 28 as seen in Fig. 2A, is dependent upon engine speed. This pressure acts against the end of a piston 262 slidable in the cylinder and connected through bearings 264 to the cam 235. Motion of the cam 235 to the right, as seen in this figure, is opposed by a compression spring 266 and a backlash spring 268. Accordingly, the cam 235 is balanced in a position dependent upon the force exerted by these springs on the one hand, and the pressure in the cylinder 234 as controlled by speed of the engine.

The means for effecting angular or rotational adjustment of the cam 235 comprises a flexible diaphragm 270 urged upwardly as seen in the figure, by a compression spring 272. The diaphragm 270 closes a chamber 274 which is in communication through a conduit 276 with a source of pressure variable in accordance with engine conditions. Thus for example, the conduit 276 may conveniently connect to the manifold of the internal combustion engine. The diaphragm 270 has pivotally connected thereto a link 278 designed to operate with a crank 280 connected to the shaft 240. In the figure the pivot pins interconnecting the link 278 are shown in distorted position and it will be appreciated that this view is purely diagrammatic, the arrangement being such that vertical movement of the diaphragm 270 is transformed through the link 278 and crank 280 to rotational movement of the shaft 240. The crank 280 is connected to the shaft 240 so as to permit longitudinal sliding movement of the shaft by suitable means such as the key and slot connection diagrammatically indicated at 282.

As a result of the foregoing construction engine speed and manifold pressure are employed to position cam 235 which in turn controls a bleed valve to bleed off hydraulic fluid under pressure from the hydraulic fluid supply line to the cylinder 168. Additional means are provided for effecting an additional modification or control of pressure within the cylinder 168 and these means are diagrammatically indicated as comprising movable valve elements 284 and 286. Valve element 284 includes a contoured port 288 slidable in a cylindrical opening in a partition 290 between a supply chamber 292 and a return chamber 294. The fluid supply conduit 205 which supplies fluid to the cylinder 168 has connected thereto a bleed line branch 296, a branch of which as indicated at 298 leads to the supply chamber 292. Dependent upon the position of the valve 284, fluid is permitted to flow from the supply chamber 292 to the return chamber 294 and thence through return line 300 to return line 196, and thence to the hydraulic fluid tank 30. The position of the valve 284 may be determined by suitable temperature responsive means such for example as a movable abutment 302 which may be connected to or a part of a bi-metallic or other thermo-responsive member. The valve 284 is retained in position against the movable abutment 302 by compression spring 304. A second branch 306 leads from the fluid conduit 296 to an inlet chamber 308 which communicates with a return chamber 310 through an opening in a partition 312 in which the valve 286 is longitudinally slidable. Again, the valve 286 includes a contoured valve port 314 to control the flow of fluid from the passage 306 to the return passage 300 previously referred to. The valve 286 is controlled by other condition responsive means such for example as a bellows 316 responsive to barometric pressure or the like. Accordingly, flow of fluid through the conduit 296 is dependent jointly upon temperature and barometric pressure and the bleed flow as controlled thereby exerts a controlling influence on pressure of fluid in the conduit 205 leading to cylinder 168.

From the foregoing it will be observed that there has been devised a simple fuel feeding arrangement in which fuel is fed to the combustion chambers of an internal combustion engine in metered amounts and in properly timed relation dependent upon variable conditions. It will be appreciated that the controls so far described have all been automatic and designed to exert a controlling influence on the feeding of fuel, in accordance with engine conditions such as speed and manifold pressure, and external conditions such as temperature and barometric pressure. Additional controls responsive to other and different conditions may be applied in an obvious manner. Also, suitable means may be provided for effecting manual adjustment and control of the operation of the system in an obvious manner.

The drawings and the foregoing specification constitute a description of the improved fuel injection system in such full, clear, concise and exact terms as to enable any persons skilled in the art to practice the invention, the scope of which is indicated by the appended claims.

What we claim as our invention is:

1. A fuel injection system for an engine comprising an injection nozzle, a fuel pump connected to said nozzle and operable to maintain a constant supply of high pressure fuel at said nozzle, a valve controlling discharge of fuel through said nozzle, a hydraulic pump, hydraulically actuated means connected to said hydraulic pump for controlling opening and closing movement of said valve, rotary timing means driven in timed relation to said engine including valve means controlling application of hydraulic pressure from said hydraulic pump to said hydraulically actuated means in timed relation to engine speed.

2. A fuel injection system for an internal combustion engine comprising a fuel nozzle, means for supplying fuel under injection pressure continuously to said nozzle, a normally closed valve in said nozzle, a hydraulic valve actuator in said nozzle, and means operated in timed relation to engine operation to supply repeated hydraulic pressure impulses to said actuator to open said valve in properly timed relation to engine operation.

3. A system as defined in claim 2 in which said valve is held closed by pressure of fuel except when opened by said actuator.

4. A system as defined in claim 3 in which said actuator comprises a chamber having a movable wall, and a valve engaging element carried by said movable wall whereby fuel pressure on said valve operates to return said movable wall between valve opening movements thereof.

5. A fuel injection system for an internal combustion engine comprising a fuel nozzle, means for supplying fuel under injection pressure continuously to said nozzle, a normally closed valve in said nozzle, a hydraulic valve actuator in said nozzle, a source of hydraulic fluid under pressure, a rotary valve between said source and said actuator and adapted to be rotated by said engine, said rotary valve being axially movable to vary the duration of nozzle valve opening, resilient means urging said rotary valve in one axial direction, hydraulic means urging said rotary valve in the other axial direction, a connection from said source to said hydraulic means, said connection having a restriction therein and a bleed valve between said restriction and said hydraulic means, and control means for adjusting said bleed valve to control the pressure applied to said hydraulic means.

6. Fuel supply means for an internal combustion engine including an intake manifold, comprising a rotary valve, means mounting said valve for axial adjustment, said valve having means thereon effective upon angular adjustment to effect a variation in fuel supply, resilient means urging said rotary valve in one axial direction, hydraulic means urging said rotary valve in the other axial direction, a source of hydraulic fluid under pressure, a passage connecting said source to said hydraulic means, said passage having a restriction therein, a bleed valve intermediate said restriction and said hydraulic means for controlling the pressure of hydraulic fluid applied to said hydraulic means, a three dimensional cam mounted for angular and axial adjustment, means responsive to variations in engine speed and manifold pressure for adjusting said cam, a cam follower engaging said cam and operatively connected to said bleed valve to control the hydraulic pressure applied to said hydraulic means in accordance with engine speed and manifold pressure.

7. A fuel supply system for an internal combustion engine including an intake manifold, comprising a fuel injection nozzle, a high pressure hydraulically actuated fuel pump effective to maintain a constant supply of liquid fuel under high pressure at said nozzle, a fuel valve at said nozzle, a high pressure hydraulic pump, means supplying high pressure hydraulic fluid from said hydraulic pump to said fuel pump to operate the same, hydraulic means for operating said fuel valve, means supplying high pressure hydraulic fluid to said hydraulic means to operate said fuel valve, and control valve means responsive to engine speed controlling the application of hydraulic fluid to said hydraulic means.

8. A fuel supply system for an internal combustion engine including an intake manifold, comprising a fuel injection nozzle, a high pressure hydraulically actuated fuel pump effective to maintain a constant supply of liquid fuel under high pressure at said nozzle, a fuel valve at said nozzle, a high pressure hydraulic pump, means supplying high pressure hydraulic fluid from said hydraulic pump to said fuel pump to operate the same, hydraulic means for operating said fuel valve, means supplying high pressure hydraulic fluid to said hydraulic means to operate said fuel valve, and control valve means responsive to manifold pressure controlling the application of hydraulic fluid to said hydraulic means.

9. A fuel supply system for an internal combustion engine including an intake manifold, comprising a fuel injection nozzle, a high pressure hydraulically actuated fuel pump effective to maintain a constant supply of liquid fuel under high pressure at said nozzle, a fuel valve at said nozzle, a high pressure hydraulic pump, means supplying high pressure hydraulic fluid from said hydraulic pump to said fuel pump to operate the same, hydraulic means for operating said fuel valve, means supplying high pressure hydraulic fluid to said hydraulic means to operate said fuel valve, and control means responsive jointly to engine speed and manifold pressure controlling the application of hydraulic fluid to said hydraulic means.

10. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, and control valve means responsive to engine speed controlling the application of hydraulic fluid to said hydraulic means.

11. A fuel supply system for an internal combustion engine comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, and control valve means responsive to manifold pressure controlling the application of hydraulic fluid to said hydraulic means.

12. A fuel supply system for an internal combustion engine comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, and control valve means responsive jointly to engine speed and manifold pressure controlling the application of hydraulic fluid to said hydraulic means.

13. A fuel supply system for an internal combustion engine including an intake manifold comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive to engine speed controlling the application of hydraulic fluid to said hydraulic means, said control valve means comprising a rotary valve member, means associated with said valve member for supplying high pressure hydraulic fluid to said hydraulic means during a portion of each rotation of said valve member, and means for rotating said valve member in timed relation to engine speed.

14. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive to manifold pressure controlling the application of hydraulic fluid to said hydraulic means, said control valve means comprising a rotary valve member, means associated with said valve member for supplying high pressure hydraulic fluid to said hydraulic means during a portion of each rotation of said valve member, and means for rotating said valve member in timed relation to engine speed.

15. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive jointly to engine speed and manifold pressure controlling the application of hydraulic fluid to said hydraulic means, said control valve means comprising a rotary valve member, means associated with said valve member for supplying high pressure hydraulic fluid to said hydraulic means during a portion of each rotation of said valve member, and means for rotating said valve member in timed relation to engine speed.

16. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive to engine speed controlling the application of hydraulic fluid to said hydraulic means, said control valve means comprising a rotary valve member, means associated with said valve member for supplying high pressure hydraulic fluid to said hydraulic means during the portion of each rotation of said valve member, means for rotating said valve member in timed relation to engine speed, and means responsive to the aforesaid condition operably connected to said control valve means for varying the portion of rotation of the valve member during which hydraulic fluid is supplied to said fuel valve.

17. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive to manifold pressure controlling the application of hydraulic fluid to said hydraulic means, said control valve means comprising a rotary valve member, means associated with said valve member for supplying high pressure hydraulic fluid to said hydraulic means during a portion of each rotation of said valve member, means for rotating said valve member in timed relation to engine speed, and means responsive to the aforesaid condition operably connected to said control valve means for varying the portion of rotation of the valve member during which hydraulic fluid is supplied to said fuel valve.

18. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive jointly to engine speed and manifold pressure controlling the application of hydraulic fluid to said hydraulic means, said control valve means comprising a rotary valve member, means associated with said valve member for supplying high pressure hydraulic fluid to said hydraulic means during a portion of each rotation of said valve means, means for rotating said valve member in timed relation to engine speed, and means responsive jointly to engine speed and manifold pressure operably connected to said control valve means for varying the portion of rotation of the valve member during which hydraulic fluid is supplied to said fuel valve.

19. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive to engine speed controlling the application of hydraulic fluid to said hydraulic means, said control valve means comprising a valve housing having ports therein, a rotary valve member having recesses controlling flow of hydraulic fluid through said ports, said valve member being axially movable in said housing, the circumferential extent of said recesses differing at different axially spaced points along said valve member, and means responsive to the aforesaid condition for shifting said valve member axially.

20. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive to manifold pressure controlling the application of hydraulic fluid to said hydraulic means, said control valve means comprising a valve housing having ports therein, a rotary valve member having recesses controlling flow of hydraulic fluid through said ports, said valve member being axially movable in said housing, the circumferential extent of said recesses differing at different axially spaced points along said valve member, and means responsive to the aforesaid condition for shifting said valve member axially.

21. A fuel supply system for an internal combustion engine including an intake manifold, comprising a fuel injection nozzle, a high pressure fuel pump effective to maintain a constant supply of liquid fuel under high pressure at said nozzle, a fuel valve at said nozzle, a high pressure hydraulic pump, hydraulic means for operating said fuel valve, means supplying high pressure hydraulic fluid to said hydraulic means to operate said fuel valve, control valve means responsive jointly to engine speed and manifold pressure controlling the application of hydraulic fluid to said hydraulic means, said control valve means comprising a valve housing having ports therein, a rotary valve member having recesses controlling flow of hydraulic fluid through said ports, said valve member being axially movable in said housing, the circumferential extent of said recesses differing at different axially spaced points along said valve member, and means responsive jointly to engine speed and manifold pressure for shifting said valve member axially.

22. A fuel injection system for an engine including an intake manifold, comprising an injection nozzle, a fuel pump connected to said nozzle and operable to maintain a constant supply of high pressure fuel at said nozzle, a valve controlling discharge of fuel through said nozzle, a hydraulic pump, hydraulically actuated means connected to said hydraulic pump for controlling opening and closing movement of said valve, rotary timing means driven in timed relation to said engine including valve means controlling application of hydraulic pressure from said hydraulic pump to said hydraulically actuated means in timed relation to engine speed, said rotary timing means being adjustable axially, said valve means including means effective to vary relative duration of application of pressure to said hydraulically actuated means during each rotation of said rotary timing means in accordance with axial adjustment of said rotary timing means, and control means for effecting axial adjustment of said rotary timing means.

23. A fuel injection system for an engine including an intake manifold, comprising an injection nozzle, a fuel pump connected to said nozzle and operable to maintain a constant supply of high pressure fuel at said nozzle, a valve controlling discharge of fuel through said nozzle, a hydraulic pump, hydraulically actuated means connected to said hydraulic pump for controlling opening and closing movement of said valve, rotary timing means driven in timed relation to said engine including valve means controlling application of hydraulic pressure from said hydraulic pump to said hydraulically actuated means in timed relation to engine speed, said rotary timing means being adjustable axially, said valve means including means effective to vary relative duration of application of pressure to said hydraulically actuated means during each rotation of said rotary timing means in accordance with axial adjustment of said rotary timing means, and control means responsive to engine speed for effecting axial adjustment of said rotary timing means.

24. A fuel injection system for an engine including an intake manifold, comprising an injection nozzle, a fuel pump connected to said nozzle and operable to maintain a constant supply of high pressure fuel at said nozzle, a valve controlling discharge of fuel through said nozzle, a hydraulic pump, hydraulically actuated means connected to said hydraulic pump for controlling opening and closing movement of said valve, rotary timing means driven in timed relation to said engine including valve means controlling application of hydraulic pressure from said hydraulic pump to said hydraulically actuated means in timed relation to engine speed, said rotary timing means being adjustable axially, said valve means including means effective to vary relative duration of application of pressure to said hydraulically actuated means during each rotation of said rotary timing means in accordance with axial adjustment of said rotary timing means, and control means responsive to manifold pressure for effecting axial adjustment of said rotary timing means.

25. A fuel injection system for an engine including an intake manifold, comprising an injection nozzle, a fuel pump connected to said nozzle and operable to maintain a constant supply of high pressure fuel at said nozzle, a valve controlling discharge of fuel through said nozzle, a hydraulic pump, hydraulically actuated means connected to said hydraulic pump for controlling opening and closing movement of said valve, rotary timing means driven in timed relation to said engine including valve means controlling application of hydraulic pressure from said hydraulic pump to said hydraulically actuated means in timed relation to engine speed, said rotary timing means being adjustable axially, said valve means including means effective to vary relative duration of application of pressure to said hydraulically actuated means during each rotation of said rotary timing means in accordance with axial adjustment of said rotary timing means, and control means responsive jointly to engine speed and manifold pressure for effecting axial adjustment of said rotary timing means.

26. A fuel injection system for an engine including an intake manifold, comprising an injection nozzle, means for maintaining a supply of fuel under pressure at said nozzle, a valve at said nozzle controlling discharge of fuel therethrough, a fluid operated control device for controlling said valve, a source of fluid under pressure, means connecting said source to said device including means for controlling the application of fluid under pressure to said device comprising valve means, fluid pressure operated means for adjusting said valve means, a fluid passage connecting said source to said fluid pressure operated means, a bleed line connected to said passage, and a condition responsive valve responsive to engine speed in said bleed line to bleed fluid from said line in accordance with said condition to control pressure in said passage in accordance with the value of the condition.

27. A fuel injection system for an engine including an intake manifold, comprising an injection nozzle, means for maintaining a supply of fuel under pressure at said nozzle, a valve at said nozzle controlling discharge of fuel therethrough, a fluid operated control device for controlling said valve, a source of fluid under pressure, means connecting said source to said device including means for controlling the application of fluid under pressure to said device comprising valve means, fluid pressure operated means for adjusting said valve means, a fluid passage connecting said source to said fluid pressure operated means, a bleed line connected to said passage, and a condition responsive valve responsive to manifold pressure in said bleed line to bleed fluid from said line in accordance with said condition to control pressure in said passage in accordance with the value of the condition.

28. A fuel injection system for an engine including an intake manifold, comprising an injection nozzle, means for maintaining a supply of fuel under pressure at said nozzle, a valve at said nozzle controlling discharge of fuel therethrough, a fluid operated control device for controlling said valve, a source of fluid under pressure, means connecting said source to said device including means for controlling the application of fluid under pressure to said device comprising valve means, fluid pressure operated means for adjusting said valve means, a fluid passage connecting said source to said fluid pressure operated means, a bleed line connected to said passage, and a condition responsive valve responsive jointly to engine speed and manifold pressure in said bleed line to bleed fluid from said line in accordance with said conditions to control pressure in said passage in accordance with the value of the conditions.

29. A fuel injecting system for an engine including an intake manifold, comprising an injection nozzle, means for maintaining a supply of fuel under pressure at said nozzle, a valve at said nozzle controlling discharge of fuel therethrough, a fluid operated control device for controlling said valve, a source of fluid under pressure, means connecting said source to said device including means for controlling the application of fluid under pressure to said device comprising valve means, fluid pressure operated means including a movable member for adjusting said valve means, a fluid passage connecting said source to said fluid pressure operated means to bias said member in one direction, resilient means biasing said member in the opposite direction, a bleed line connected to said passage, and a condition responsive valve responsive to engine speed in said bleed line to bleed fluid from said line in accordance with said condition to control pressure in said passage in accordance with the value of the condition.

30. A fuel injection system for an engine including an intake manifold, comprising an injection nozzle, means for maintaining a supply of fuel under pressure at said nozzle, a valve at said nozzle controlling discharge of fuel therethrough, a fluid operated control device for controlling said valve, a source of fluid under pressure, means connecting said source to said device including means for controlling the application of fluid under pressure to said device comprising valve means, fluid pressure operated means including a movable member for adjusting said valve means, a fluid passage connecting said source to said fluid pressure operated means to bias said member in one direction, resilient means biasing said member in the opposite direction, a bleed line connected to said passage, and a condition responsive valve responsive to manifold pressure in said bleed line to bleed fluid from said line in accordance with said condition to control pressure in said passage in accordance with the value of the condition.

31. A fuel injection system for an engine including an intake manifold, comprising an injection nozzle, means for maintaining a supply of fuel under pressure at said nozzle, a valve at said nozzle controlling discharge of fuel therethrough, a fluid operated control device for controlling said valve, a source of fluid under pressure, means connecting said source to said device including means for controlling the application of fluid under pressure to said device comprising a valve means, fluid pressure operated means including a movable member for adjusting said valve means, a fluid passage connecting said source to said fluid pressure operated means to bias said member in one direction, resilient means biasing said member in the opposite direction, a bleed line connected to said passage, and a condition responsive valve responsive jointly to engine speed and manifold pressure in said bleed line to bleed fluid from said line in accordance with said conditions to control pressure in said passage in accordance with the value of the conditions.

References Cited in the file of this patent

UNITED STATES PATENTS

| | | |
|---|---|---|
| 1,252,254 | Fisher | Jan. 1, 1918 |
| 1,816,157 | Scott | July 28, 1931 |
| 2,378,036 | Reggio | June 12, 1945 |
| 2,378,037 | Reggio | June 12, 1945 |
| 2,621,640 | Reggio | Dec. 16, 1952 |
| 2,749,897 | Reiners | June 12, 1956 |

FOREIGN PATENTS

| | | |
|---|---|---|
| 558,092 | Great Britain | Dec. 21, 1943 |
| 1,010,566 | France | Mar. 26, 1952 |
| 755,104 | Germany | Mar. 22, 1954 |